United States Patent

Lemelson

[11] 4,038,011
[45] July 26, 1977

[54] APPARATUS FOR FORMING RIBBED TUBING

[76] Inventor: Jerome H. Lemelson, 85 Rector St., Metuchen, N.J. 08840

[21] Appl. No.: 544,833

[22] Filed: Jan. 28, 1975

Related U.S. Application Data

[63] Continuation-in-part of Ser. No. 319,194, Dec. 29, 1972, and a continuation-in-part of Ser. No. 68,724, Sept. 1, 1970, Pat. No. 3,708,253.

[51] Int. Cl.² .............................................. B29D 23/04
[52] U.S. Cl. .................................... 425/325; 425/380; 425/393; 425/396; 425/467
[58] Field of Search ............... 425/325, 327, 392, 393, 425/396, 303, 336, 326 B, 387 B, 380, 404, 467, 145, 150; 264/40, 284, 293

[56] References Cited

U.S. PATENT DOCUMENTS

| | | | |
|---|---|---|---|
| 2,449,139 | 9/1948 | Posner | 425/385 X |
| 2,657,431 | 11/1953 | Slaughter | 425/326 B X |
| 3,025,562 | 3/1962 | Nelson | 425/393 X |
| 3,052,916 | 9/1962 | Campbell | 425/326 B X |

FOREIGN PATENT DOCUMENTS

| | | | |
|---|---|---|---|
| 49,042 | 7/1934 | Denmark | 425/327 |
| 563,937 | 6/1957 | Italy | 425/327 |
| 308,956 | 10/1955 | Switzerland | 425/327 |

Primary Examiner—Francis S. Husar
Assistant Examiner—Mark Rosenbaum

[57] ABSTRACT

An apparatus and method are provided for forming tubing by extrusion of a plastic or metal in an extrusion die over a mandrel supported within the die opening, and immediately after the tubing leaves the die but is still supported by the mandrel, operating thereon to provide a plurality of circular formations in the outer surface of the tubing for improving the physical characteristics of the tubing wall. In one form, the circular formations are provided by means of two or more reciprocating tools which engage and compress the freshly formed tubing against the mandrel, in an intermittent manner so as to form circular corrugations or thread-like formations in the outer stratum of the tube wall while the inside surface of the tube is maintained substantially in the configuration of the mandrel over which it is formed.

3 Claims, 3 Drawing Figures

APPARATUS FOR FORMING RIBBED TUBING

RELATED APPLICATIONS

This is a continuation-in-part of application Ser. No. 319,194 filed Dec. 29, 1972 for Apparatus and Method For Producing Composite Extrusions, a continuation-in-part of Ser. No. 68,724 filed Sept. 1, 1970 for Extrusion Apparatus, now U.S. Pat. No. 3,708,253 and co-pending at the time application Ser. No. 734,685 filed June 5, 1968 for Extrusion Die Apparatus was pending, the latter being a continuation-in-part of application Ser. No. 142,405 filed Oct. 2, 1961 now U.S. Pat. 3,422,648.

SUMMARY OF THE INVENTION

This invention relates to an apparatus for producing tubing having a relatively smooth internal wall and an external wall which is formed with a plurality of closely spaced circular formations such as ribs or threads which serve to enhance the stiffness of the wall of the tubing and resist buckling thereof and, in certain instances, to improve the heat transfer characteristics of the tubing.

It is known in the art to form tubing with a helically extending corrugation formed of the tubing wall and defining irregular internal and external surfaces. While such tubing has a variety of applications, it is not generally used for conducting liquids for the reason that the irregular internal configuration thereof offers a substantial amount of resistance to the flow of liquid in the form of profile drag which is manifested by turbulence and irregular flow.

The instant invention is drawn to an improved apparatus and method for producing a tube of plastic or metal having a wall shaped with a relatively smooth internal surface of constant cross sections and an external surface having a ribbed configuration wherein the ribs are formed in the outer stratum of the tube wall and preferably extend circularly around a substantial portion of if not the entire tube wall. As a result, liquids and gases may be flowed through the tubing without drag and turbulence caused by irregular wall formations, yet the advantages derived from stiffening the tube wall with irregular formations provided in the outer stratum thereof, are attained. Such tubing may be flexed to a much greater degree than tubing without the external wall formations, without buckling. The external formations may also serve to increase the radial rigidity of the tubing and provide greater resistance to buckling than tubing containing smooth external and internal wall surfaces of substantially the same weight per unit of length. Rigid plastic tubing may also be so configured, if properly dimensioned, to permit it to be bent or flexed to a substantially greater degree than tubing containing the same amount of plastic per unit length and having smooth external and internal wall surfaces. Finally, such tubing may be used to conduct a hot or cold liquid wherein it is desired to rapidly transfer heat to or from the liquid through the tube wall and the irregular formations in the tube wall serve to enhance the heat transfer function.

Accordingly it is a primary object of this invention to provide a new and improved apparatus for forming plastic or metal tubing containing irregular formations in its outer surface.

Another object is to provide an apparatus and method for producing a cylindrical tube containing a cylindrical inside surface and an irregular, shape reinforced external surface.

Another object is to provide an apparatus for irregularly shaping the external surface of a tube as it is extruded without the necessity of varying the operation of the extruder or reheating the extrusion material.

Another object is to provide an apparatus for forming lengths of plastic tubing containing irregular external surface formations designed to improve the resistance to buckling of the tubing and additional formations of different shape than said irregular formations and located along selected portions of the tubing to permit such portions to be easily assembled with fittings and the like when they are served from the main length of tubing.

Another object is to provide an extrusion apparatus including an extrusion die and a mandrel supported within the die opening for forming tubing thereon by extrusions and further including externally supported tooling for deforming the tubing immediately after it is formed by cooperating with a portion of the extrusion die mandrel extending beyond the die.

With the above and such other objects in view as may hereafter more fully appear, the invention consists of the novel constructions, combinations and arrangements of parts as will be more fully described and illustrated in the accompanying drawings, but it is to be understood that variations, changes and modifications may be resorted to which fall within the scope of the invention as claimed.

Figure 1:
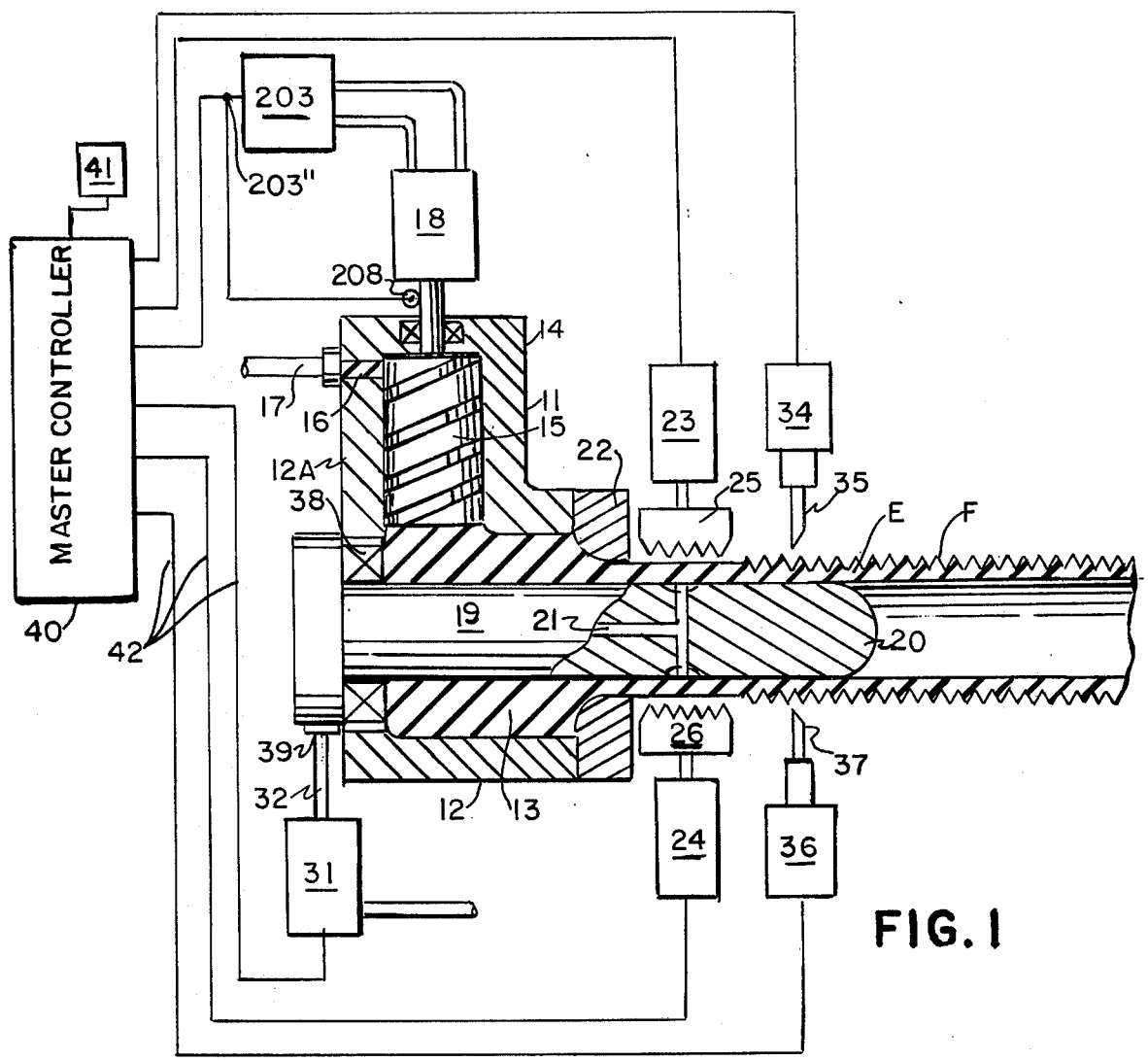
FIG. 1 is a side view with parts broken away for clarity of an extrusion apparatus defining a first embodiment of the invention.

FIG. 1 illustrates details of an extrusion apparatus for forming tubing, preferably although not necessarily of a generally cylindrical shape, and having its entire length or portions thereof formed with a series of circumferentially extending corrugations or pleats formed therein. If the tubing E is formed of a flexible plastic resin such as polyvinylchloride, polyethylene, polybutylene, ethylene vinyl-acetate, polybutadiene styrene, polypropylene, or other suitable flexible thermoplastic polymer capable of being extruded and maintained, for a short period of time immediately after extrusion, in an easily deformable condition, then the circular corrugations formed by means of the apparatus of FIG. 1 in the outer surface of the wall of the tubing, may be employed to substantially increase the rigidity of the tube wall for a particular tube internal diameter without increasing the amount of material employed to produce the tubing. In other words, by properly shaping the exterior of the tubing by means of the apparatus illustrated in FIGS. 1-3, the resistance to radial deformation of the wall of the tubing may be increased to a degree which would normally require an increase in the wall thickness of a conventional tubular extrusion with smooth internal and external walls.

If the tubing extruded by means of the apparatus of FIG. 1 is made of metal such as aluminum or copper, or a more rigid resin than the resins mentioned above, such as medium or high density polyethylene, rigid polyvinylchloride, cellulose acetate, polystyrene, polycarbonate, polyamide or other suitable rigid resin, than its rigidity may be increased along the entire length of the tubing by forming corrugations therein as will be described. Furthermore, the nature of the apparatus of FIG. 1 is such as to permit the formation of corrugations in the tubing wall along selected portions thereof, which corrugations would normally permit the corrugated portions to be more easily flexed or bent than the portions of the tube which are not so formed, thereby providing lengths of tubing having relatively rigid wall portions separated by more flexible portions which may be bent without collapsing and may be used to replace conventional fittings such as elbows and to permit bending the tube without heat softening it.

Figure 2:
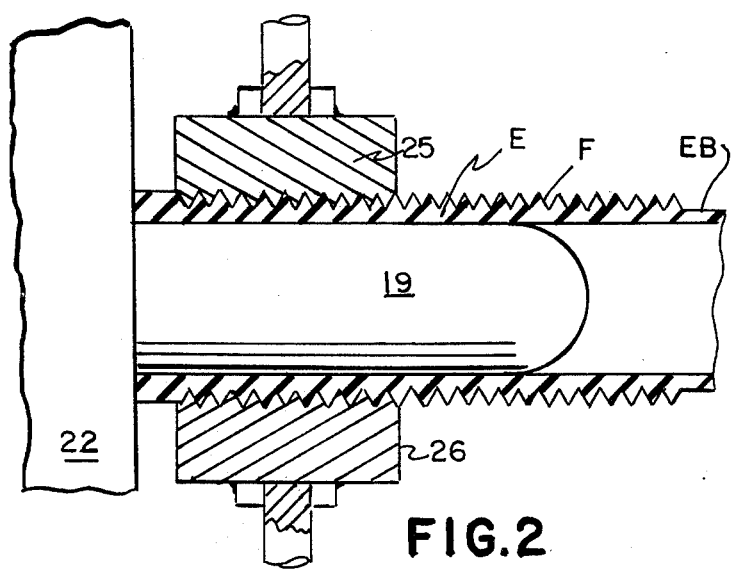
FIG. 2 is a side view with parts sectioned of a portion of the apparatus of FIG. 1 showing tooling thereof shaping the extrusion.

The apparatus 10 of FIG. 1 comprises an extrusion machine 11 of conventional design having certain modifications made thereto to permit the productions of tubing which has a smooth internal wall surface, such as a cylindrical surface, and an external surface which is formed with circular corrugations, preferably, although not necessarily, in the form of wedge shaped circular threads as illustrated along the shaped portions of the extrusion E which are denoted EB in FIGS. 1 and 2.

The extruder 11 comprises a main extrusion housing 12 defining an internal chamber 13 which has a sub-chamber housing 14 extending radially therefrom and containing an extrusion screw 15 rotatably supported therein and power rotated by means of a variable speed drive mechanism including a motor located within a housing 18 and connected to the screw 15 through a suitable drive shaft. Extrusion material is flowed through an inlet 16 to the sub-chamber housing 14, preferably from a pre-plasticizing chamber or other supply source, (not shown) connected to the inlet 16 through a conduit or injection tube 17. As the screw 15 rotates, it forces extrusion material into the chamber 13 and over a mandrel 19 which extends through and beyond both ends of the chamber.

The mandrel 19 has one end portion 20 which extends through and protrudes beyond the extrusion die 22. The other end of the mandrel 19 extends through a sealed bearing 38 supported within an opening in the rear wall 12A of the chamber housing 12. A passageway 21 extends axially through the mandrel from an inlet opening outside of the extrusion chamber to which opening a fitting 39 is connected. Fluid may be forced under pressure through the passageway 21 in mandrel 20 for the purpose of coating the inside surface of the extrusion E or forming a portion of the extrusion as will be described. Accordingly, the outlet of a pump or compressor 31 is connected through a conduit 32 to the fitting 39 for delivering one or more fluids to the passageway 21 from a fluid supply (not shown.)

Supported exterior of the extruder 11 is tooling which is automatically controlled to shape the exterior surface of the tubing E in operation against the outer surface of the end portion 20 of the mandrel 19 which protrudes beyond the extrusion die 22. In FIG. 1, the tooling includes a pair of semi-circular dies 25 and 26, each of which are respectively connected to lineal actuators 23 and 24, such as air or hydraulic cylinders or motors which are operable to advance their respective dies against the extrusion immediately after it leaves the extrusion die 22 in a manner to form the extrusion against the mandrel with a plurality of circular ribs or wedge-shaped formations denoted F.

The actuators 23 and 24 are automatically operated to intermittently advance their dies 25 and 26 against the soft wall of the extrusion which is in a moldable condition as a result of its as-extruded temperature or may be rendered in such condition by heat transferred thereto from electrical heating elements (not shown) disposed and energized within the mandrel 19, particularly that portion immediately in advance of and at the location at which the dies 25 and 26 are advanced against the tubing. Hot air forced through the passageway 21 in the mandrel 19 may also be applied to heat the mandrel and the tubing as it flows over the mandrel so as to heat soften same, if necessary. Conversely, cold air or liquid may also be flowed through passageway 21 and directed against the inside surface of the extrusion E from an orifice at the end of the extrusion mandrel to rapidly cool and set the extrusion material after it is formed by dies 25 and 26. Liquid or molten plastic coating material may also be forced through passageway 21 against the inside surface of the extrusion as may a fluid under sufficient pressure to outwardly deform the extrusion against the dies 25 and 26.

Also illustrated in FIG. 1 are cutting dies 35 and 37 which are respectively advanced against the portions of the tubular extrusion aligned with the end of the mandrel 20 when their respective actuators 34 and 36 are operated, so as to cut selected portions of the extrusion in advance of the mandrel from the remaining portion of the extrusion coming out of the extruder.

Figure 3:
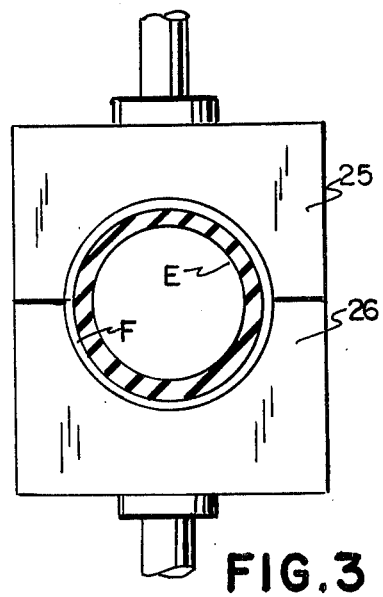
FIG. 3 is an end view of the apparatus of FIG. 3.

The operation of the various motors and actuators employed in the apparatus 10 is illustrated as being automatically controlled by a program controller 40 which may comprise a conventional multi-circuit timer or a computer having a plurality of output circuits 42 on which circuits electrical energy from a source 41 is sequentially gated to the controls or power inputs for the various described devices. For example, when electrical energy is applied on one of the circuits 42 to the inputs for the lineal actuators 23 and 24, the forming dies 25 and 26 are immediately advanced against and operate to form the outer stratum of the extrusion E. If such energy is applied as a short time duration pulse, and the actuators 23 and 24 are monostable in operation with respective spring operated returns, the dies will be immediately retracted after forming the extrusion so as not to interfere with the forward travel of the extrusion over the mandrel. The motor located within housing 18 for driving the extrusion screw may be operated at constant speed and controlled in its operation by means of a suitable constant speed motor or an automatic control system employing a feedback signal generated by sensing the output speed of the motor driving the extrusion feed screw 15. A suitable feedback control system which may be employed in the apparatus of FIGS. 1–3 is described in U.S. Pat. No. 3,708,253 and utilizes an electro-hydraulic control system denoted 203 in FIG. 1 which controls the speed of the motor in housing 18 in response to a signal generated by a resistence or inductance tachometer 208 driven by the shaft of the feed screw motor 18. The signal so generated is bucked against an input signal generated by a signal source within the master controller and fed to a comparator 203' such as a summing amplifier as described in U.S. Pat. No. 3708253. Such a control system has the advantage in that it not only controls the speed of the extrusion E maintaining it constant at all time by correcting minor variations in speed as they occur but also permits adjustments to be effected of the speed of the extrusion screw drive motor in the event that tooling is changed such as the changing of dies and wall forming tools. Such adjustment may be effected by the use of a manually adjustable voltage variation means such as a variable potentiometer in the circuit of the source of reference voltage provided as part of the master controller 40. It is noted that if the signal source for reference voltage applied to the comparator 203" is generated from a recording or other means which may vary the characteristics of the reference signal then the speed of the extrusion passing from the extrusion die 22 may be predeterminately varied in a cycle which slows down or stops the extrusion while the tools 25 and 26 operate thereon. Also, if the master controller is a multi-circuit self-recycling timer or a series of switches which are controlled in their operation by cams on the shaft of a constant speed gearmotor, then signals may be generated on the outputs 42 thereof which signals will control the operation of the actuators 23 and 24 to cause forming tools 25 and 26 to engage only selected portions of the wall of the extrusion against mandrel 19 leaving selected portions thereof void of the rib-like formations F so that when the tubing E is cut to length or otherwise fabricated along the non-deformed portions thereof, fitting such as couplings may be easily joined and sealed thereto.

The drawings illustrate the circular rib-like formations F as forming a stratum defining about half of the total thickness of the formed wall of the extruded tube. While the height of the deformations F will be determined by the characteristics of the particular extrudate employed, the dimater and wall thickness of the tubing and the desired strength and flexure characteristics of the finished extrusion, for most applications the rib-like formations F will preferably be formed of a stratum of the original extrusion which stratum extends from between one half and three quarters of the wall thickness of the extrusion as extruded. The rib-like formations may be formed immediately adjacent each other with flat tapered side walls as illustrated by suitably formed multiple ribbing of the dies 25 and 26 or by respective single tooth dies which rapidly oscillate against and out of the outer stratum of the extrusions as it passes over the end portion 20 of the mandrel.

FIGS. 2 and 3 show the extrusion E being formed by the tools 25 and 26 against the mandrel. By properly controlling the operation of the tools or shaping portions thereof, flat portions EB may be retained or shaped in the wall of the extruded tube to which flat portions suitable fitting may be attached when the tubing is cut to length. The tapered rib-like circular formations F may also have other configurations such as semi-circular or trapazoidal rib-like shapes.

I claim:

1. An apparatus for forming a tubular extrusion having a smooth inside wall surface and an irregular external wall surface comprising:

first means for extruding a plastic material in the shape of a tube, said first means including an extrusion die and a stationary mandrel extending through said die for forming the inside surface of a tubular extrusion formed in said die, said mandrel having an end portion protruding a distance outwardly from said die, second means including tooling located externally of said die, said tooling including a pair of forming dies each having at least one semi-circular rib-like formation, said forming dies being operable to engage the tubular extrusion formed in said die against the end portion of said mandrel immediately after said extrusion has exited from said die, third means connected to said tooling for powering operating said tooling in synchronization with the movement of the extrusion from said die to cause said tooling to intermittently engage and disengage said tubing against said mandrel and to (predeterminately) deform a portion of the outer stratum of the extrusion as the extrusion passes over said mandrel so as to mold a plurality of circumferentially extending circular rib-like formations around said wall of said extrusion for varying the physical characteristics of said tubular extrusions.

2. An apparatus in accordance with claim 1 wherein said second means include a plurality of tube wall forming dies disposed around said end portion of said mandrel and each containing a plurality of semi-circular rib-like formations protruding therefrom which dies are operable to engage the outer stratum of the tubing extruded from said extrusion die as said tubing is supported by said mandrel and form a plurality of semi-circular rib-like formations in the wall of said tubing.

3. An apparatus in accordance with claim 2 wherein said plurality of forming dies comprise at least two die elements supported for movement toward and away from opposite wall portions of the tubular extrusion at it moves along said end portion of said mandrel and means operatively associated with said dies for reciprocably moving said forming dies toward and away from said extrusion so that each of said dies forms a plurality of rib-like formations in the outer stratum of the extrusion which said dies engage each time they are moved toward the extrusion.

* * * * *